United States Patent Office.

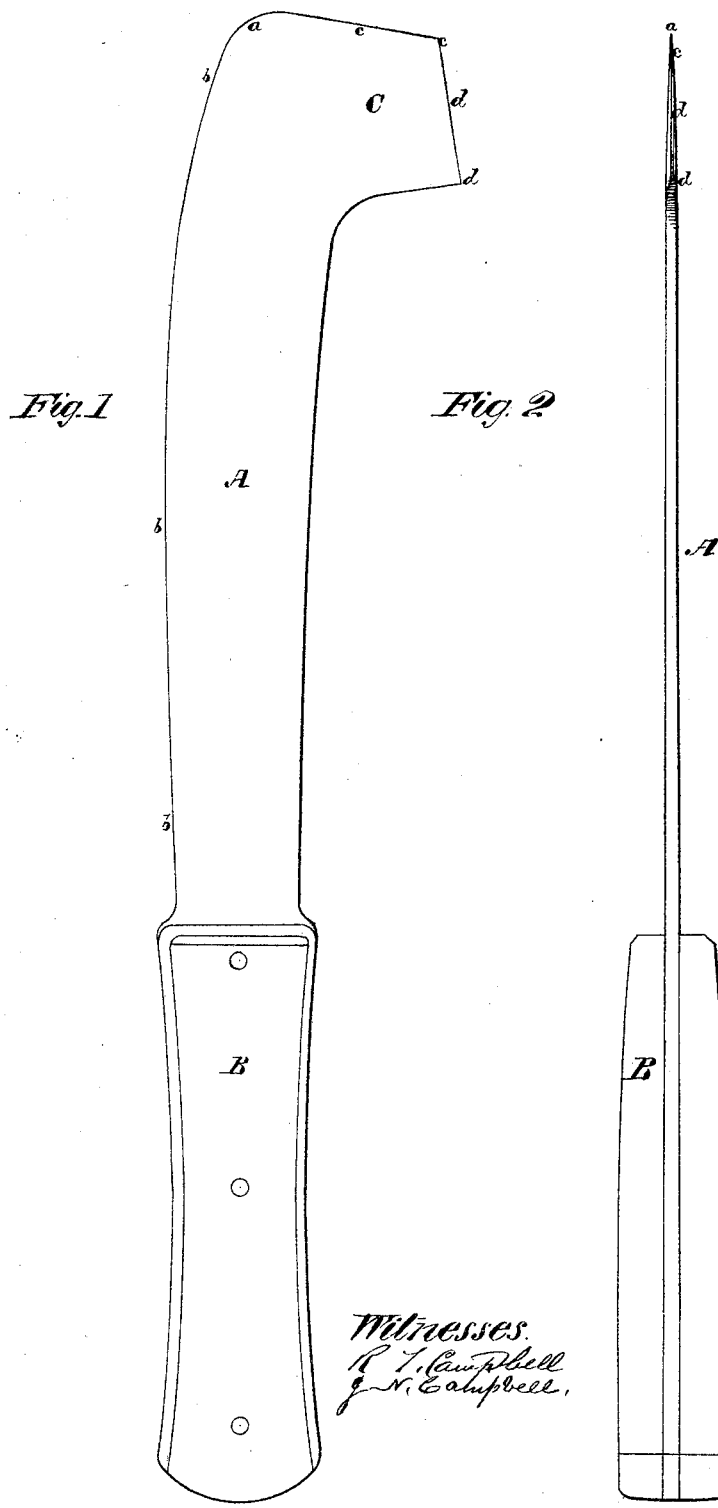

JACOB W. ANDROVATT AND TRUMAN W. JOLINE, OF TOTTENVILLE, NEW YORK.

Letters Patent No. 114,388, dated May 2, 1871.

IMPROVEMENT IN KITCHEN-KNIVES.

The Schedule referred to in these Letters Patent and making part of the same.

*To all whom it may concern:*

Be it known that we, JACOB W. ANDROVATT and TRUMAN W. JOLINE, of Tottenville, in the county of Richmond and State of New York, have invented a new and improved Kitchen-Knife; and we do hereby declare that the following is a full, clear, and exact description thereof, reference being had to the accompanying drawing making part of this specification, in which—

Figure 1 is a view of one side of the improved knife.

Figure 2 is an edge view of the knife.

Similar letters of reference indicate corresponding parts in the several figures.

The object of our invention is to improve knives which are used for domestic purposes by the addition to their ends of angular scraping-edges adapted for scraping out the sides and angles of pans, as will be hereinafter explained.

The following is a description of our improved knife:

The handle B and the long flat blade A are made of the usual form for kitchen-knives.

On the end of the blade A a hooked portion, C, is formed, which projects from the back edge of the blade so as not to interfere in any manner with the long cutting-edge $b$ of the blade.

At the junction of the cutting or scraping-edge $c$ of portion C is a rounded scraping or cutting-edge, $a$, which with the edge $c$ will be used for scraping out the corners of pans or other vessels whose sides are perpendicular or nearly so to their bottoms and whose angles are slightly rounded.

The cutting or scraping-edge $d$ forms with the edge $c$ an obtuse angle, and these two edges are adapted to work in close contact with the angles formed by the flaring sides and flat bottoms of a variety of pans or other culinary vessels.

It will be seen that the portion C is formed on the blade A, and will not interfere with the use of this blade for cutting purposes.

We are aware of the skinning and pruning-knife of Babcock and Gordsell, and we therefore do not claim a knife which is shaped as shown in their patent, nor do we claim a knife with combined serrated and smooth edge, the said edges uniting at the angle or bend of the blade; but What we do claim as our invention is—

The improved domestic knife herein described and shown as a new article of manufacture, to wit: said knife being made with a smooth cutting-edge, $b\ b\ b\ a$, rounded or corner-sharp scraping-edge $a$, and a hooked end, C, bounded on two sides by scraping-edges, $c\ d$, which form an obtuse angle, $c$, all as shown and described.

JACOB W. ANDROVATT.
TRUMAN W. JOLINE.

Witnesses:
G. G. CUNNINGHAM,
A. H. WOOD.